UNITED STATES PATENT OFFICE.

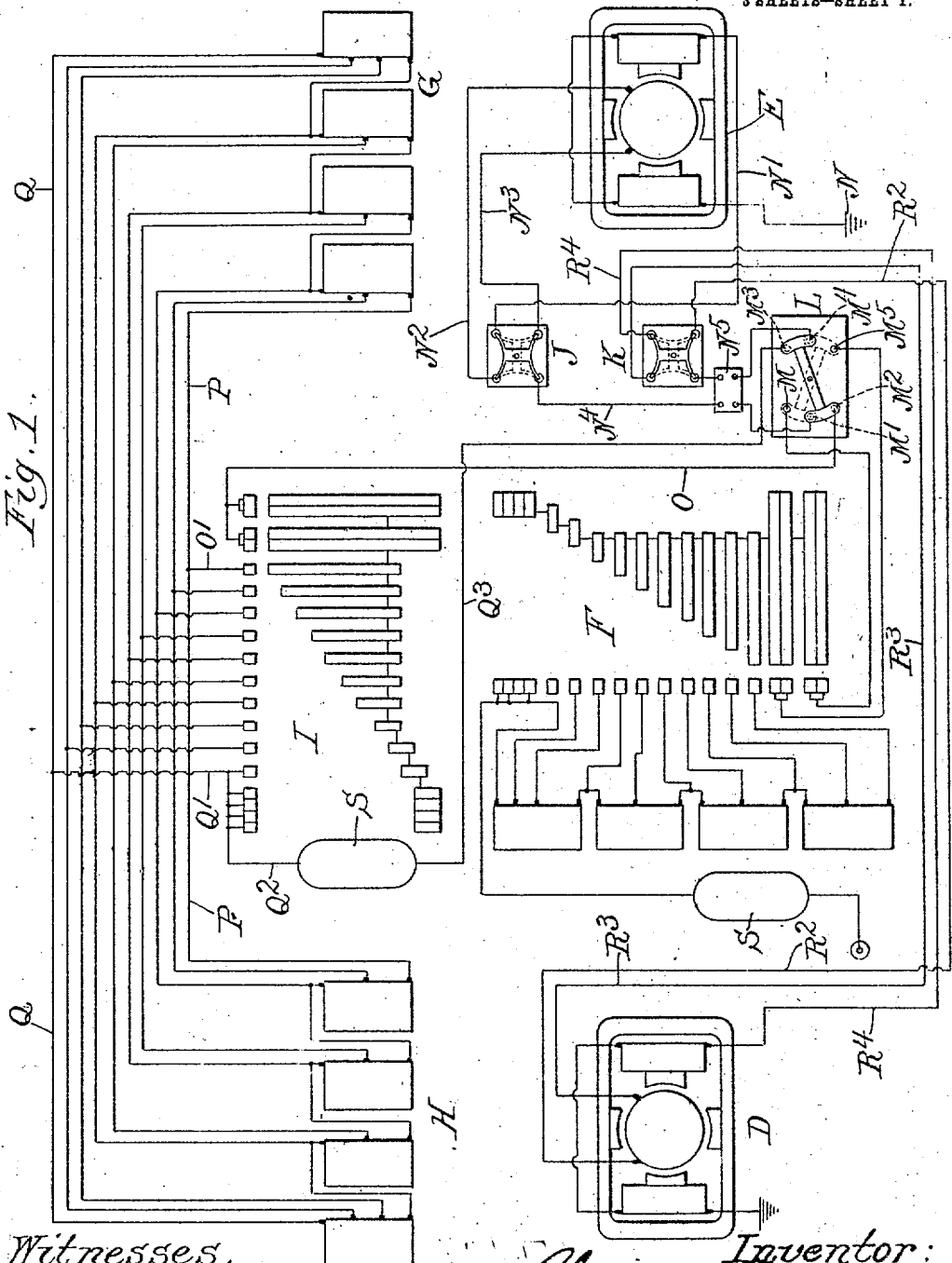

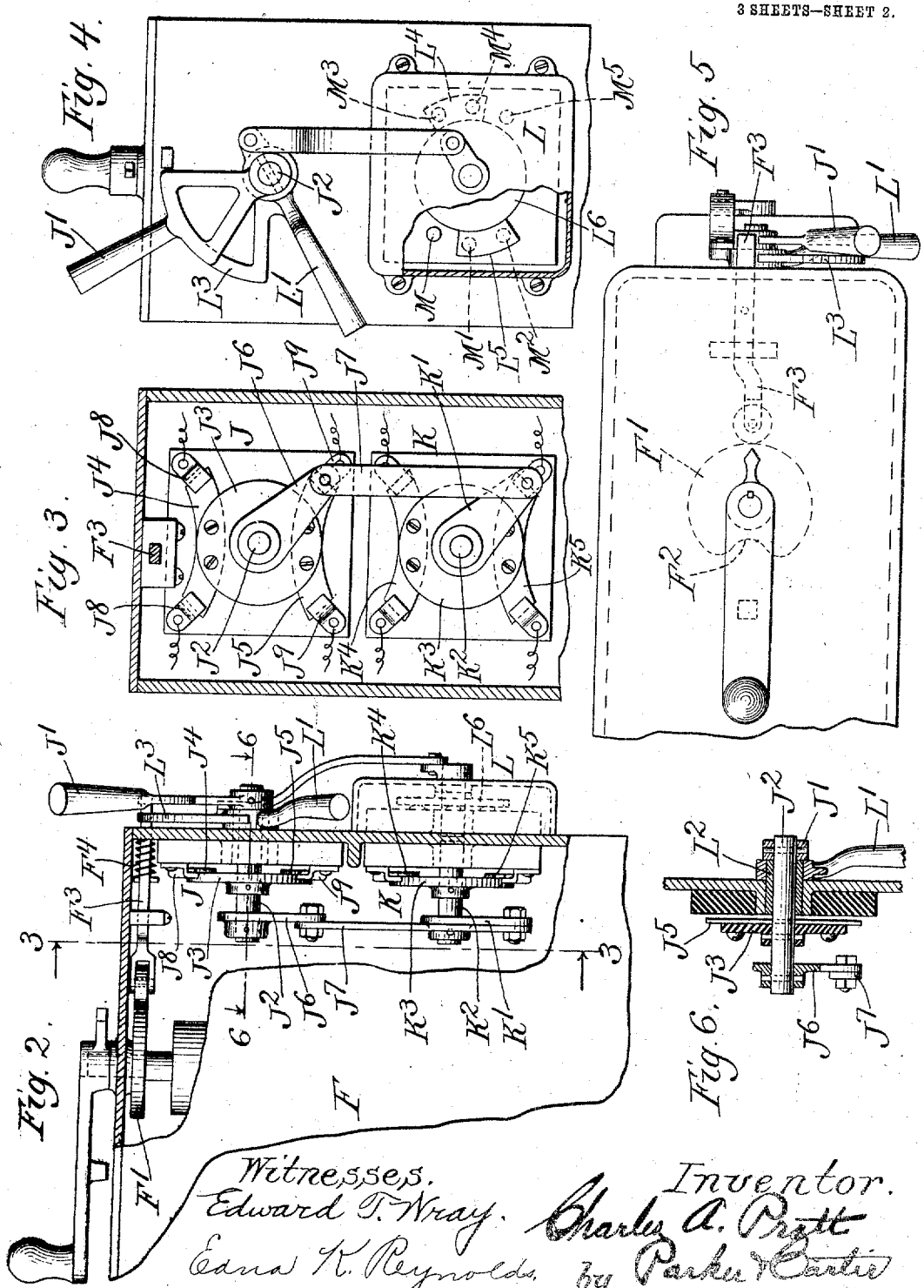

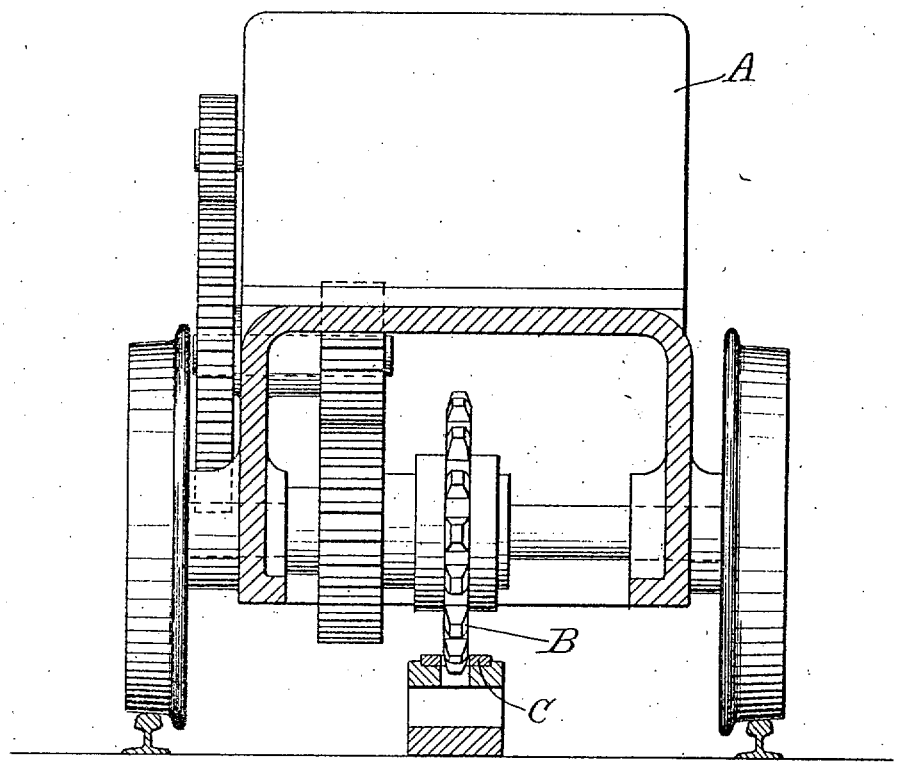

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

RACK-RAIL LOCOMOTIVE.

956,732.

Specification of Letters Patent.     Patented May 3, 1910.

Application filed January 28, 1907. Serial No. 354,426.

*To all whom it may concern:*

Be it known that I, CHARLES A. PRATT, a citizen of the United States, residing at Chicago, in the county of Cook and State of Illinois, have invented a certain new and useful Improvement in Rack-Rail Locomotives, of which the following is a specification.

This invention relates to rack rail locomotives, and has for its object to provide a new and improved device of this description.

This invention is illustrated in the accompanying drawings, wherein—

Figure 1 is a diagrammatic view showing the motors and controllers for electric circuits; Fig. 2 is a view showing the switches connected with the operating controllers; Fig. 3 is a sectional view taken on line 3—3 of Fig. 2; Fig. 4 is a side elevation of the controller shown in Fig. 2; Fig. 5 is a plan view of the controller shown in Fig. 2; Fig. 6 is a sectional view taken on line 6—6 of Fig. 2; Fig. 7 is a sectional view through the locomotive showing the connection to the rack rail.

Like letters refer to like parts throughout the several figures.

The locomotive A may be of any desired description, and is provided with one or more sprocket wheels B which engage a rack rail C, the locomotive ordinarily being driven by means of this connection to the rack rail. When, for example, the motor is running down hill the construction is such that the motor will run as a dynamo, and the current developed used in any desired manner, as by being passed into rheostats or back onto the line by suitable connections leading to the trolley or the third rail, thus producing a braking effect upon the locomotive due to the work required of the motor.

In Fig. 1 there is illustrated a diagrammatic view of the electric circuits of a locomotive element, and for purpose of illustration two motors and two controlling devices are shown. By means of two motors a sufficiently high potential can be secured to force the current back on the line, even when the device is running at comparatively slow speed, that is, when the motor is running at slower speed than it would be when operating the locomotive.

Referring to Fig. 1, two motors D and E are shown diagrammatically. A motor controller F of the usual construction may be used. As illustrated in Fig. 1, there is shown also a series of braking rheostats G and H into which the current may be directed to secure the braking effect. When these rheostats are used a braking controller I is also provided. When the motors are operating to operate the locomotive the controller F is used, and when the motors are operating as dynamos the controller I is used. Interlocking mechanism is provided so that only one controller can be operated at a time. Any desired arrangement to secure this result may be provided. As herein shown the controller F has associated with it the reversing switches J, K, and the switch L which controls the connection between the motors and the controller I. The switches are arranged so that they cannot be changed when the arm of the controller F is moved from its initial position, thus making it impossible to operate both controllers at the same time. As herein shown this result is secured by providing the controller F with the disk $F^1$ provided with a notch $F^2$. An arm $F^3$ is arranged so as to engage the disk $F^1$ and projects into the path of the controlling part for the switches except when the handle of the controller is in its initial position, in which event the engaging part on the arm $F^3$ enters the depression or groove $F^2$. The arm $F^3$ is normally forced toward the disk $F^1$ by the spring $F^4$. The switches J and K are provided with an operating handle $J^1$ arranged so as to strike the end of the arm $F^3$ if it is attempted to move said handle after the handle of the controller F is moved from its initial position. Any suitable arrangement of these switches J and K may be provided. As herein shown the handle $J^1$ is connected to the shaft $J^2$ upon which is mounted the part $J^3$ carrying the contacts $J^4$, $J^5$. The shaft $J^2$ is provided with a crank $J^6$ to which is connected a connecting link $J^7$ engaging a crank $K^1$ on a shaft $K^2$ carrying the part $K^3$ to which are attached the contacts $K^4$, $K^5$. Associated with the contacts $J^4$ and $J^5$ are the contacts $J^8$ and $J^9$ arranged upon a stationary part so that when the shaft $J^2$ is rotated the contacts $J^3$ and $J^4$ will be moved to disconnect contacts $J^8$ from each other and contacts $J^8$ from each other, and connect contacts $J^8$ with contacts $J^9$. The switch L is provided with a controlling handle $L^1$ which is shown as being mounted upon a sleeve $L^2$ on the shaft $J^2$. This handle is arranged with an engaging part L³ which engages the arm F³ when it is attempted to move the arm L² after the arm of the controller F is moved from its initial position. The switch L is provided with the contacts L⁴, L⁵ mounted upon a non-conducting piece L⁶ which is connected with the handle L¹ so as to be rotated when the handle is moved. The contacts L⁴ and L⁵ coöperate with contacts M to M⁵ inclusive. When the controller F is operated the motors are run in the ordinary manner as motors and drive the locomotive. When the locomotive is running down hill and it is desired to run the motors as dynamos to generate current to secure the braking effect, the handle of the controller F is moved to its initial position where the engaging part of arm F³ will be in the depression or groove F² so as to withdraw the arm F³ out of the way of the arms of the switches. The switches J, K and L are then moved to the position shown in full lines in Fig. 1. The motors are then connected with the controller I. If the controller I is now operated when the locomotive is in motion the motors will be driven as dynamos through the connection with the rack C, and the current conducted to the braking rheostats G and H where it is dissipated in heat. The connection between the rack rail and the sprocket wheels and motors constitutes a positive connection preventing any slippage so that the motors are positively actuated as dynamos and the maximum braking effect positively and certainly secured.

When the controller I is in operation and the motors are running as generators, the circuit may be traced as follows: from the ground N through the field magnets of motor E, thence by conductor N¹ to switch J, the switches being in the position shown in the full lines at this time, thence by conductor N² through the armature of motor E, thence by conductor N³ to switch J, thence by conductor N⁴ to fuse block N⁵, thence to contact M¹, thence by switch L to contact M², thence by conductor O to the controller I, thence through the contacts of said controller to conductor O¹, thence through conductor P to the rheostats G and H, thence by conductor Q and conductors Q¹, Q² and Q³ to contact M³, thence by switch L to contact M⁴, thence to fuse block N⁶, thence to switch K, thence by conductor R² through the armature of motor D, thence by conductor R³ to switch K, thence by conductor R⁴ through the field magnets of motor D, and thence to the ground. It will be seen that the current can be sent through as many of the rheostat elements G and H as desired by proper manipulation of the controller I, for the purpose of varying the braking effect.

Blow-out coils S are shown diagrammatically in Fig. 1.

It will be noted that there is here provided a power system having a plurality of electric machines capable of being used as motors or generators, there being power driving connections between them and to an extraneous source. This power driving connection may, for example, consist simply of the gearing of the motors, the sprocket wheels to which this gear is connected and the rack rail to which the sprocket wheels are connected. The electric machines can be connected to any extraneous source and as herein shown, this extraneous source includes the driving wheels and the rack.

I claim:

1. The combination with a rack rail locomotive having supporting wheels therefor of a motor adapted to operate the same, a positive driving connection separate from the supporting wheels for driving the motor as a dynamo when the locomotive is running down grade, and means for utilizing the current thus developed whereby a braking effect is secured and the progress of the locomotive retarded.

2. The combination with a locomotive having supporting wheels therefor of a motor for driving the same, a rack rail along which the locomotive runs, a sprocket wheel on the locomotive engaging the rack, a positive connection between the motor and the sprocket wheel, whereby the sprocket wheel may either be driven or its rotation resisted, two controllers for the motor one for controlling it when it is running as a motor, and the other when it is running as a dynamo, a reversing switch associated with one controller and means for preventing one controller from becoming operative while the other is in operation.

3. The combination with a locomotive having supporting wheels therefor of a motor for driving the same, a rack rail along which the locomotive runs, a positive connection between the motor and the rack rail, two controllers for the motor one for controlling it when it is running as a motor, and the other when it is running as a dynamo, a reversing switch associated with one controller and means for preventing one controller from becoming operative while the other is in operation, an operative connection between said means and the reversing switch and a series of braking rheostats connected with one of said controllers.

4. The combination with a rack rail locomotive having supporting wheels therefor of a motor adapted to operate it, means separate from the supporting wheels for positively driving the motor as a dynamo when the locomotive is running down grade, and controlling apparatus for controlling the current of said motor when acting as a dynamo, for the purpose of securing a braking effect on the locomotive.

5. The combination with a locomotive of a motor for driving the same, a rack rail along which the locomotive runs, a positive connection between the motor and the rack rail, two controllers for the motor one for controlling it when it is running as a motor, and the other for controlling it when it is running as a dynamo and non-frictional means for resisting the movement of the locomotive when one controller is in use.

6. The combination with a locomotive of a motor for driving the same, a rack rail along which the locomotive runs, a positive connection between the motor and the rack rail, two controllers for the motor one for controlling it when it is running as a motor, and the other for controlling it when it is running as a dynamo, and a braking rheostat connected with one of said controllers and separate from said positive connection between the motor and the rack rail.

7. In a power system a plurality of electric machines capable of being used either as motors or generators, power driving connections between them and to an extraneous source, and electrical connections between said machines and to a power absorbing means.

8. In a power system a plurality of electric machines capable of being used either as motors or generators, power driving connections between them and to an extraneous source, and electrical connections between said machines and to the electrical supply system for returning power thereto.

9. A rack rail power system comprising a plurality of electric machines capable of being used either as motors or generators, power driving connections between them and to an extraneous source, electrical connections between said machines and to a power absorbing means, the said power driving connections including the rack.

10. In a locomotive power system, a plurality of electric machines capable of being used either as motors or generators, power driving connections between them and to an extraneous source, electric connections to such machines and to a power absorbing means, the said extraneous source including the driving wheels.

CHARLES A. PRATT.

Witnesses:
EDNA K. REYNOLDS,
LUCY A. FALKENBERG.